June 18, 1968   F. E. McNULTY   3,388,723

PIPE COVERED WITH LAMINATED ELASTIC PROTECTIVE WRAPPING

Filed April 20, 1964

FRANK E. McNULTY
INVENTOR.

United States Patent Office 3,388,723
Patented June 18, 1968

3,388,723
PIPE COVERED WITH LAMINATED ELASTIC PROTECTIVE WRAPPING
Frank E. McNulty, Tulsa, Okla., assignor to Nee & McNulty, Inc., a corporation of Oklahoma
Filed Apr. 20, 1964, Ser. No. 361,078
6 Claims. (Cl. 138—144)

ABSTRACT OF THE DISCLOSURE

The invention comprises essentially an elastic mesh material coated on at least one side thereof with a bituminous waterproofing composition. Such wrapping material may be applied directly to a cold pipe surface with or without the use of a primer. As the pipe is wrapped, the tar or similar material tends to squeeze through the mesh backing and also at the overlaps as tension is applied. This provides a cold flow or bonding action at the overlaps which tar-plastic continuous or imperforate film laminates are incapable of doing.

---

This invention relates to a novel type of wrapping material for pipelines and similar conduits. More particularly, it is concerned with a wrapping material comprising essentially an elastic gauze or screen coated on at least one side thereof with a suitable bituminous or similar waterproofing agent.

Many wrapping tapes of the type employed to protect pipe in the past have been made of cotton or glass fabric coated on both sides with a coal tar pitch or similar waterproofing composition. This type of protective wrapping was fabricated in rolls having between each layer a parchment like strip sheet preferably coated on both sides with a silicone to permit rapid unwinding. This material was applied by removing a small length from the roll, heating one side of it with a torch and placing the hot melted side of the tape in contact with the pipe or fitting to be protected. Usually a liquid primer was applied to the surface of the pipe or fitting and allowed to dry before placing the tape thereon to enable the latter to form a better bond with the metal surface.

Tapes employing cotton as the reenforcing component suffer from the disadvantage that cotton itself is subject to decomposition when buried underground for extended periods of time causing the protective layer of tar to cold flow and leaving bare portions of the pipe. Although tapes employing glass were not subject to this defect, they had other disadvantages such as: (1) they had no stretch or elasticity and hence when used to wrap irregular surfaces or fittings conformed poorly to the surface to be protected; (2) glass threads exhibit the phenomenon of capillary attraction or "wicking" as is known in this art and as a result take up water or atmospheric moisture which prevents the use of the usual holiday inspection techniques using electrical flaw detectors, as the entire coating surface becomes conductive. This also can provide a conductive system for electrolysis currents.

Plastic film laminates have also been used but these too have not been without defects. Specifically, tapes of this kind form a poor bond at the overlap when spirally wound on pipe. Thus, when winding such tape onto the pipe, the seal at the overlap is formed by the fact that the tape is in tension. If the pipe is moved laterally in the ditch there is a tendency for these overlaps to be scuffed and displaced allowing moisture to enter.

Accordingly, it is an object of my invention to provide a pipeline wrapping tape employing a stretchable reenforcing plastic mesh or plastic thread cloth, coated on at least one side thereof with any of the well known waterproofing compositions that have been used for coating pipelines or similar conduits. It is also an object of my invention to provide a tape of the kind just mentioned which can be applied by hand or machine and which can be solvent bonded to the surface to be protected by means of a solvent primer compatible with said composition. It is another object of my invention to provide a tape suitable for wrapping both even and irregular surfaces, said tape being capable of forming permanent water tight seals at the tape overlap wherein said seals are formed by continuous tension exerted by an elastic gauze reenforcing material on a bituminous waterproofing composition adjacent and between said overlaps. Another object is to provide a reenforcing material for bituminous and similar coatings that does not decompose when buried in soil or take up moisture when in contact therewith.

An embodiment of my invention is directed to a wrapping tape for pipes and similar conduits wherein such tape comprises essentially an elastic mesh or gauze-like material coated by calendering or other known methods on one or both sides with a bituminous waterproofing composition. Preferably such gauze is prepared from a stretchable plastic such as polypropylene, polyethylene, nylon, plasticized polyvinyl chloride and the like. This gauze, when coated with coal tar or other suitable waterproofing material forms a tape that can be stored in rolls or spools. If the tape is coated on both sides with tar, each layer should be separated by sheets of paper that do not adhere to said layers.

In application of the wrapping material of my invention, said tape may be directly applied cold to the pipe surface and, if desired, without the use of a previously applied primer, although a primer is frequently preferred because it aids in the formation of a stronger bond between the waterproofing composition and said surface. As the pipe is wrapped, the tar or similar material tends to squeeze through the gauze or mesh backing and also at the overlaps as tension is applied. This provides a cold flow or bonding action at the overlaps which tar, plastic, continuous or imperforate film laminates are incapable of accomplishing.

Figure 1:
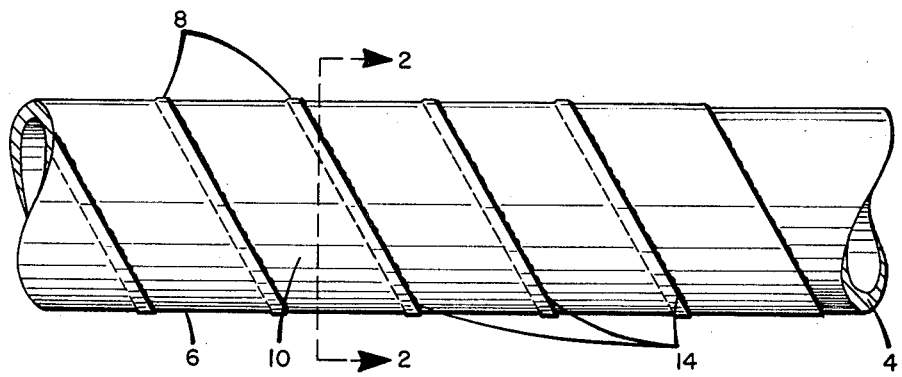
FIGURE 1 is an isometric fragmentary view of a pipe wrapped with the tape of my invention.
Figure 2:
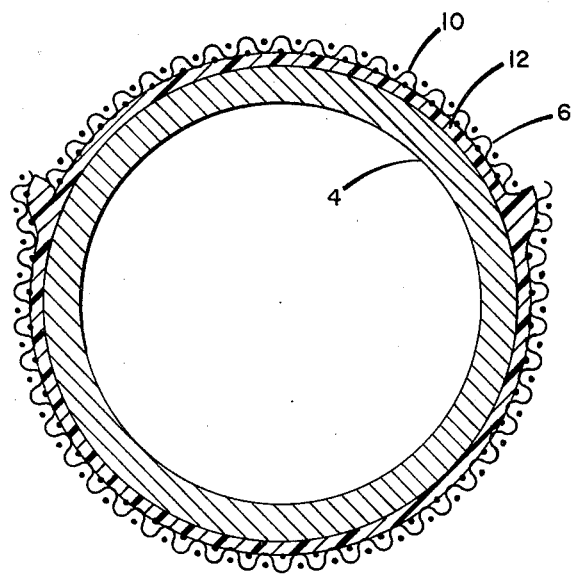
FIGURE 2 is a sectional view of the pipe shown in FIGURE 1 taken along line 2—2.

The tape of my invention may be further illustrated by reference to the accompanying drawings wherein FIGURE 1 represents a segment of pipeline 4 spirally wrapped with tape 6—consisting of a plastic gauze 10 having a layer of coal tar 12 on the inside thereof—so as to create overlapped portions 8. Tape 6 is wound onto pipe 4 either by hand or machine under tension causing coal tar 12 to be forced through to the surface of the stretchable plastic gauze 10 and in the form of a bead 14 at overlapped portions 8.

In contrast to cotton reenforcing fabric used in the past, the plastic gauze contemplated by my invention is inert with respect to soil when buried in direct contact therewith. Moreover, moisture can not travel into such a system because the plastic does not exhibit wicking or capillary attraction. Hence said gauze is well suited for lamination to the outside of the waterproof composition layer, thereby furnishing maximum soil stress shielding to the underlying waterproofing composition when a line thus wrapped has been buried. In the case of cotton or glass fabric reenforced tapes, the waterproofing composition had to be applied to both sides to protect the cotton from deteriorating and to prevent wicking in the case of glass fabric.

Other advantages of the tape of my invention over those of the prior art include the elasticity thereof which permits a high degree of conformation and adherence of the waterproofing composition to irregular surfaces. Pipe wrapping material, using gauze of the type contemplated herein as a carrier for said waterproofing composition, affords a backing for said composition which permits said wrapping material when in roll form to be unwound at high speeds without offsetting or delaminating. Also, tapes employing the principle of my invention can be fabricated wherein the plastic gauze is completely embedded in the tar. This, however, requires the use of a strip paper sheet or equivalent material between the wound layers of tape to permit ready unwinding without delamination. Regardless of whether my tapes are prepared by placing the waterproofing composition on one or both sides of the plastic gauze, the latter, when applied to the pipe, becomes embedded in said composition. Sometimes, however, the gauze becomes exposed owing to the action of soil stress on the exterior coat of said composition. In the case of continuous film plastic tapes, lateral movement of the pipe can cause parting at the overlaps. Oftentimes when this occurs shielded holidays are produced which cannot be cathodically protected. The cold flow bonding action, characteristic of the tapes of my invention, through the plastic mesh and at the overlaps, permits a build up of adhesion between the plies minimizing any tendency to part at the overlap and render it possible to overcome one of the serious drawbacks common to the aforesaid continuous film plastic tapes.

The plastic gauze employed may vary widely in mesh size; however, such size should be sufficiently coarse to permit impregnation of embedment of the tar. Generally speaking, gauze having no more than 30 or 40 threads to the inch should be used. Ordinarily, gauze woven to have from 10 by 20 to 26 by 34 threads to the inch is preferred. In this connection it is to be understood that the expressions "plastic gauze" or "plastic mesh" are to be construed to include such materials as perforated elastic films or plastic screen having a porosity substantially equivalent to that possessed by the woven embodiment defined immediately above.

Generally speaking, the thickness of the applied tape depends on the service required and the environment. The coal tar and similar compositions may be fortified to extend and improve their performance characteristics by incorporating therein plasticizers and/or plasticized vinyl materials. Thus, jet fuel resistant tar in combination with the aforesaid plastic gauze provides an excellent wrapping material to protect buried pipelines. The tar should be sufficiently non-tacky and soft to permit easy unwinding and application of the tape over the relatively wide temperature range, e.g., from about 0° to about 110° F., encountered in pipeline installation operations.

In fabricating the laminated tapes of my invention it may be desirable in some instances to use a small amount of a mutual solvent for the plastic gauze and the tar in order to improve the bonding action between the two. For example, in preparing tapes from plasticized polyvinyl chloride gauze and coal tar, a solvent for these materials such as methyl ethyl ketone may be sprayed on the joining surfaces of the gauze and tar during the calendering operation to give a strongly bonded laminated product.

What I claim is:

1. A reinforced covered tubular conduit for underground use comprising a length of pipe material, a flexible wrapping covering said pipe material, the flexible wrapping being under tension and wrapped about said pipe material in a spiral with an overlap formed on each previous convolution of said wrapping, said wrapping comprising an elastic plastic gauze coated on the side adjacent said conduit with a layer of a bituminous cold flowing waterproofing composition, said composition extending through said gauze at said overlap and forming an outwardly protruding bead which forms a liquid-tight seal at said overlap.

2. The conduit of claim 1 in which said gauze has a porosity corresponding to a fabric having from not more than about 30 to 40 threads to the inch.

3. The conduit of claim 1 in which said waterproofing composition is deformable over a temperature range of from about 0° to about 110° F.

4. A conduit as described in claim 1 in which the plastic gauze is made of polyethylene.

5. The conduit of claim 1 in which the plastic gauze is made of polypropylene.

6. The conduit of claim 1 in which the plastic gauze is made of nylon.

References Cited
UNITED STATES PATENTS

| | | | |
|---|---|---|---|
| 2,690,769 | 10/1954 | Brown | 138—126 X |
| 2,713,551 | 7/1955 | Kennedy | 161—47 X |
| 2,748,805 | 5/1956 | Winstead | 138—144 |
| 2,823,156 | 2/1958 | Hedges | 161—89 |
| 2,828,798 | 4/1958 | Hopkins et al. | 156—187 |
| 3,033,724 | 5/1962 | Stokes | 161—49 X |
| 3,072,512 | 1/1963 | Dalle | 161—89 |
| 3,205,913 | 9/1965 | Ehlers | 138—125 |
| 3,297,461 | 1/1967 | Siddall | 161—89 X |
| 3,321,357 | 5/1967 | Kennedy | 161—236 XR |

ROBERT F. BURNETT, *Primary Examiner.*

ALEXANDER WYMAN, *Examiner.*

R. H. CRISS, *Assistant Examiner.*